(12) United States Patent
Verreault (10) Patent No.: US 6,694,010 B1
(45) Date of Patent: Feb. 17, 2004

(54) RECOGNITION OF A SINGLE FREQUENCY TONE

(75) Inventor: Eric Verreault, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/299,604

(22) Filed: Apr. 27, 1999

(51) Int. Cl.[7] .............................. H04M 1/00; H04M 3/00
(52) U.S. Cl. ..................... 379/386; 379/283; 379/339; 379/142.18; 379/418; 704/262; 704/219; 704/216; 702/73
(58) Field of Search ................... 379/386, 283, 379/339, 351, 22.02, 142.18, 418; 704/262, 219, 216, 217, 218; 600/544; 702/73, 76

(56) References Cited

U.S. PATENT DOCUMENTS

| 5,495,526 | A |   | 2/1996  | Cesaro ...................... 379/386 |
| 5,513,649 | A | * | 5/1996  | Gevins et al. .............. 600/544 |
| 5,619,565 | A |   | 4/1997  | Cesaro ...................... 379/386 |
| 6,067,518 | A | * | 5/2000  | Morii ......................... 704/262 |
| 6,157,712 | A | * | 12/2000 | Wikstrom .................. 379/386 |

OTHER PUBLICATIONS

Makhoul, J. "Linear Prediction: A Tutorial Review", Proceedings of the IEEE, vol. 63, No. 4(Apr. 1975), pp. 561–580.

* cited by examiner

Primary Examiner—Minsun Oh Harvey
Assistant Examiner—Con P. Tran
(74) Attorney, Agent, or Firm—Blake, Cassels & Graydon LLP (57) ABSTRACT

A fast-converging, computationally simple, method for recognizing a single frequency tone or a sinusoid in a signal without prior knowledge of the tone frequency. The method employs a second order or higher auto-regressive model and includes: (a) sampling the signal at a constant sampling rate, and, for each sample, recursively determining a finite number of correlation coefficients using a time-reversed, exponentially weighted, future sliding equivalent of the signal, wherein the correlation coefficients are determined using pre-existing values of the correlation coefficients determined in a previous iteration, a current sample of the signal and at least two consecutively previous samples of the signal; (b) periodically determining at least the second auto-regressive coefficient modeling the signal using the correlation coefficients; and (c) recognizing the presence of the tone based on the value of the second auto-regressive coefficient.

18 Claims, 3 Drawing Sheets

RECOGNITION OF A SINGLE FREQUENCY TONE

FIELD OF THE INVENTION

The invention relates to the art of recognizing a single frequency tone in a signal, and more particularly, the recognition of such a tone in a signal without any prior knowledge or expectation of the tone frequency.

BACKGROUND OF THE INVENTION

In echo-cancelers, it is necessary to freeze or disable the echo-cancelling operation when specific tones are propagated through the echo-canceller. One well-known case of such a tone is the AC15 tone used for inter-PBX signalling (as set forth in Signalling System AC15, British Telecom Network Requirement Document No. BTNR181). PBXs using this signalling scheme do so by using a single frequency tone of 2280 Hz. It is possible for two interconnected PBXs to generate the 2280 Hz tone simultaneously. Thus, if an echo-canceller is in the exchange path of the two PBXs, the echo-canceller could eliminate the tone in one direction simply because the tone in this direction can be considered as the echo of the signal in the opposite direction.

There are many other standardized bi-directional signal tone exchanges. For example:

1) Continuity testing (1004 Hz);
2) AC15 (2280Hz);
3) ITU-T Signalling System No. 4 (2040 Hz and 2400 Hz);
4) ITU-T Signalling System No. 5 (2400 Hz and 2600 Hz);
5) ITU-T Signalling System No. 6 and No. 7 (2010 Hz);
6) China PTT TS-02 (2600 Hz.

These, as well as many other standardized single tone exchanges, employ numerous different single tone frequencies which must be detected for various purposes.

One way to solve the tone detection problem is to tailor multiple specific-tone detectors to detect every one of the frequencies involved. These prior art tone detectors are capable of detecting a single tone based on an expectation of what that tone should be. The drawback with these types of detectors is that their usability is restricted to the pre-programmed frequencies, i.e., one detector is required for each frequency one is trying to detect. Thus, the processing requirement grows linearly with the number of distinct frequencies, which must be detected. It would be more advantageous to have a more generic tone detector, which has the capability to recognize if a signal is a pure sinusoidal tone and, if so, to determine the frequency thereof. Such a detector would have the distinct advantage of not having to know all the single frequencies involved in the network. Also, because such a detector can dynamically determine the frequency, various other benefits can be gained. For instance, it is possible to detect the echo protector tone used in the prologue of full-duplex voiceband data such as defined in V.25 EPT, V.8, or V.8bis standards (see, respectively, ITU-T Recommendation V.25 (1996), Automatic answering equipment and general procedures for automatic calling equipment on the general switched telephone network including procedures for disabling of echo control devices for both manually and automatically established calls;

ITU-T Recommendation V.8 (1994), Procedure for starting sessions of data transmission over the general switched telephone network; and ITU-T Recommendation V.8bis (1996), Procedure for the identification and selection of common modes of operation between data circuit-terminating equipment (DCEs) and between data terminal equipment (DTEs) over the general switched telephone network and on leased point-to-point telephone-type circuits).

A number of prior art techniques have been proposed to model sinusoidal signals. These include Prony's method or Pisarenko's spectral line decomposition. Unfortunately, these two methods use fairly complex mathematical operations: Prony's method requires a polynomial root extraction and Pisarenko's technique requires calculating Eigenvalues and Eigenvectors. (See, respectively, deProny, Baron Gaspard Riche, "Essai expérimental et analytique: sur les lois de la dilatabilité de fluides elastique et sur celles de la force expansive de la vapeur de l'alkool, à différentes températures", *Journal de l'École Polytechnique*, 1795, volume 1, cahier 22, 24–76; and Pisarenko, V. F., "The Retrieval of Harmonics from a Covariance Function", *Geophysical Journal of the Astronomical Society*, 1973, 33:347–366).

However, one technique, which tends to be mathematically simpler, is the auto-regressive modeling or linear prediction coding. For instance, U.S. Pat. No. 5,495,526 to Cesaro et. al. and U.S. Pat. No. 5,619,565 to Cesaro et. al. disclose single frequency tone recognition techniques based on the auto-regressive model. The drawback with the techniques outlined in these patents is the imprecision of the algorithms used to determine the auto-regressive coefficients. Secondly, these techniques use an adaptive filter, which consequently results in a comparatively long time required to detect a single tone frequency, i.e., poor convergence time.

SUMMARY OF INVENTION

The invention seeks to overcome many of the disadvantages of the prior art and more particularly provide a single frequency tone detector able to detect a tone in a signal without any prior knowledge or expectation of the tone frequency.

Broadly speaking, one aspect of the invention provides a method for recognizing a tone in a signal using at least a second order non-biased auto-regressive model defined by a first auto-regressive coefficient and a second auto-regressive coefficient. The method includes:

(a) sampling the signal at a constant sampling rate and, for each sample thereof, recursively determining a finite number of current correlation coefficients using an exponentially weighted, future sliding equivalent of the signal. The signal is time reversed such that prior to each determination of the current correlation coefficients as aforesaid, a current received sample and consecutively received previous samples of the signal are time reversed such that the current received sample is defined as an oldest sample, an oldest of the consecutively received previous samples is defined as a current sample and, where more than two consecutively received previous samples of the signal are used in the determination, all the consecutively received previous samples other than the oldest thereof are also defined to be time reversed as to their received sampling order. The current correlation coefficients are determined using pre-existing values of the correlation coefficients determined in a previous determination, the current sample and at least two consecutively received previous samples of the signal;

(b) periodically determining at least a second auto-regressive coefficient for modeling the signal using the correlation coefficients; and (c) recognizing the presence of the tone based on the second auto-regressive coefficient.

Another aspect of the invention provides a method for detecting a tone and its frequency in a signal using at least a second order non-biased auto-regressive model defined by a first auto-regressive coefficient and a second auto-regressive coefficient. The method includes:

(a) sampling the signal at a constant sampling rate and, for each sample therof, recursively computing a finite number of current correlation coefficients using an exponentially weighted future sliding equivalent of the signal. The signal is time reversed such that prior to each computation of the current correlation coefficients as aforesaid, a current received sample and consecutively received previous samples of the signal are time reversed such that the current received sample is defined as an oldest sample, an oldest of the consecutively received previous samples is defined as a current sample and, where more than two consecutively received previous samples of the signals are used in the computation, all the consecutively received previous samples other than the oldest thereof are also defined to be reversed as to their received sampling order. The current correlation coefficients are computed using correlation coefficients computed in a previous iteration, the current sample of the signal and at least two consecutively received previous samples of the signal;

(b) periodically computing at least the first auto-regressive coefficient and the second auto-regressive coefficient for modelling the signal using the current correlation coefficients;

(c) recognizing the presence of the tone based on the second auto-regressive coefficient; and (d) determining the frequency of the tone based on the first auto-regressive coefficient and the sampling frequency.

In the preferred embodiment of the invention, at least the first two auto-regressive coefficients modeling the signal are periodically computed using the correlation coefficients, and the frequency of the tone is determined based on the value of the first auto-regressive coefficient and the sampling frequency.

Moreover, the step of periodically determining at least a second auto-regressive coefficient is executed every P samples, P being an integer number of at least one.

Moreover, the step of recognizing the tone preferably includes confirming that the second auto-regressive coefficient is within a predetermined range of the square of an exponential decay factor used to define the exponentially weighted future sliding equivalent of the signal. The preferred embodiment additionally validates the presence of the tone by determining the power of the signal and confirming that the power exceeds a threshold power, and, optionally, by computing the first auto-regressive coefficient and confirming the stability of the first auto-regressive coefficient over a number of iterations.

It will be noted from the foregoing that no prior knowledge of the frequency of the detected tone is required. It should also be noted that a history of only three samples of the signal are required to implement the method and this, in conjunction with its recursive nature, enables the method to converge relatively quickly.

BRIEF DESCRIPTION OF DRAWINGS

The foregoing and other aspects of the invention will become more apparent from the following description of the preferred embodiments thereof and the accompanying drawings which illustrate the preferred embodiment by way of example only. In the drawings.

DETAILED DESCRIPTION OF PREFERRED EMBODIMENTS

Figure 1A:
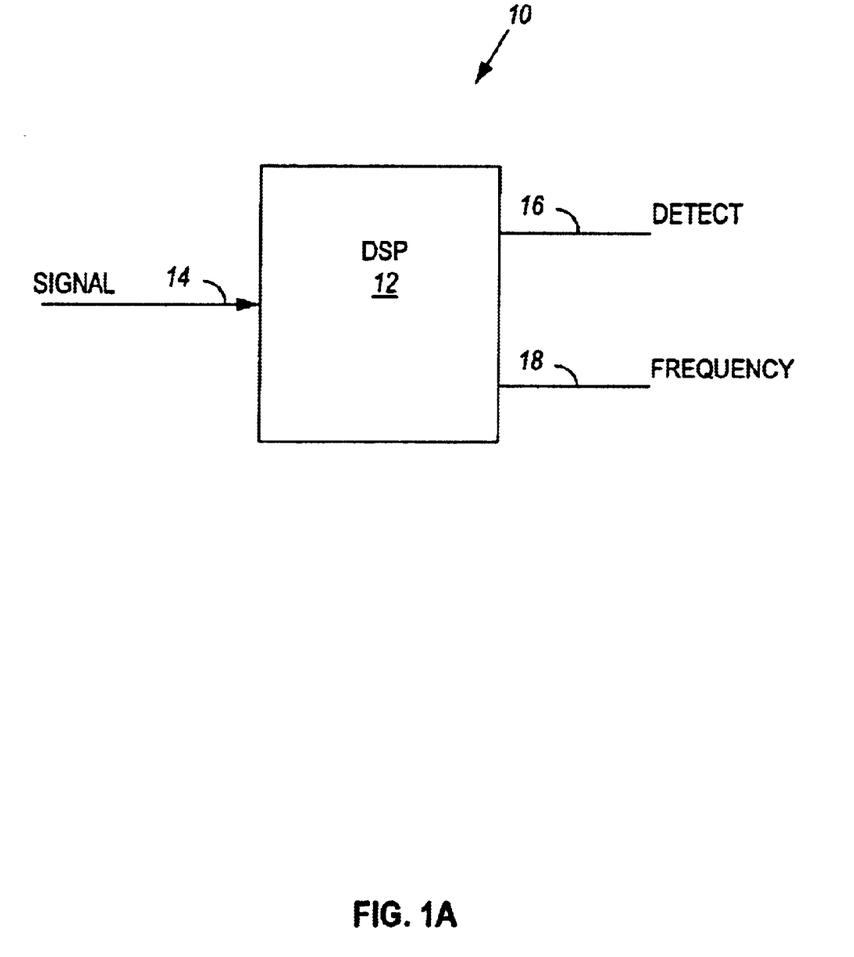
FIG. 1A is a functional block diagram of a single frequency tone detector in accordance with the preferred embodiment.

FIG. 1A shows a functional block diagram of a single frequency tone detector 10 according to the preferred embodiment. The detector 10 is preferably implemented by a digital signal processor (DSP) 12 or other type of processor or hardware commercially available from a variety of sources. The DSP 12 comprises an input line 14 for receiving an analogue signal, which is analyzed to determine if the signal currently exhibits the characteristics of a single tone frequency. The DSP 12 samples the signal on input line 14 at a fixed sampling rate $f_s$ and, through a built-in (or external) analogue-to-digital converter, provides digital values indicative of the level of the signal. These samples are used by an auto-regressive modelling or linear predictor coding program executing on the DSP 12, as discussed below, to detect the presence of tone. If a tone is detected, the DSP 12 sets a Boolean output detect signal 16 and optionally provides the value of the detected frequency on an output frequency signal 18. When no tone is detected, the detect signal 16 is reset and the frequency signal 18 is invalid.

As mentioned, the DSP 12 employs auto-regressive modeling. The basic principle behind this type of modeling is to consider the analyzed signal as being the output of a recursive filter excited by white noise. This modeling approach directly translates in the frequency domain as trying to match the transfer function of the filter to the spectral contents of the analyzed signal. The transfer function of a $p^{th}$ order auto-regressive model is:

$$H(z) = \frac{\rho}{1 + a_1 z^{-1} + a_2 z^{-2} + \ldots + a_p z^{-p}} \quad (1)$$

where the $\alpha_1$ are the auto-regressive model coefficients and $\rho$ is a gain factor. The auto-regressive model has its direct equivalent in the time domain where the H(z) transfer function becomes a linear prediction, as follows:

$$x_n = \rho u_n - a_1 x_{n-1} - a_2 x_{n-2} - \ldots - a_p x_{n-p} \quad (2)$$

where $\rho$ is a gain factor and $u_n$ is a prediction error of the system (white noise). This equation indicates that the sample $x_n$ can be predicted from the p previous samples with some error:

$$\tilde{x}_n = x_n - \rho u_n = -a_1 x_{n-1} - a_2 x_{n-2} - \ldots - a_p x_{n-p} \quad (3)$$

Minimizing the prediction error un is achieved by resolving the Yule-Walker set of equations. To detect a sinusoidal signal, it is only necessary to use a second order model. This can be understood by considering the representation of the sinusoidal signal in the Z domain: the Z transform of a pure sinusoid is represented by complex conjugate poles located exactly on the unit circle.

The Yule Walker set of equations for a $2^{nd}$ order predictor (p=2) is:

$$\begin{bmatrix} \alpha_{00} & \alpha_{01} & \alpha_{02} \\ \alpha_{10} & \alpha_{11} & \alpha_{12} \\ \alpha_{20} & \alpha_{21} & \alpha_{22} \end{bmatrix} \begin{bmatrix} 1 \\ a_1 \\ a_2 \end{bmatrix} = \begin{bmatrix} \rho^2 \\ 0 \\ 0 \end{bmatrix} \quad (4)$$

where the $a_i$ are the auto-regressive coefficients and the $\alpha_{ij}$ are the correlation coefficients of the signal $x_n$. If the gain factor is not required or used, the previous set of equations can be reduced to:

$$\begin{bmatrix} \alpha_{11} & \alpha_{12} \\ \alpha_{21} & \alpha_{22} \end{bmatrix} \begin{bmatrix} a_1 \\ a_2 \end{bmatrix} = -\begin{bmatrix} \alpha_{10} \\ \alpha_{20} \end{bmatrix} \quad (5)$$

The characteristics of interest of a sinusoidal signal are completely defined from the $a_1$ and $a_2$ coefficients, as discussed in greater detail below.

One estimate $R_{ij}$ of the correlation coefficients $\alpha_{ij}$ of the signal can be obtained from the biased correlation estimation defined by:

$$R_{ij} = \frac{1}{N} \sum_{n=0}^{N-1} x(n-i)x(n-j) \quad (6)$$

where $x(n)$ is the $n^{th}$ sample of the signal and N is the number of samples used to estimate the correlation coefficients. This estimate of the correlation implies that the data outside the N sample analysis window have a value of 0. This creates a side effect where the auto-regressive model of a time-limited sinusoid is dependent on the initial and final phase of the sinusoid, as well as the number of samples used to estimate the correlation coefficients (i.e., the "rectangular window" size). This can be better understood by noticing that the sinusoid is forced to be time limited and the Z transform of this signal is no longer represented by a pair of complex conjugate poles located exactly on the unit circle.

A more preferred alternative to the biased correlation estimation provided by equation (6) is to artificially reduce the number of samples used in the cross product $[x(n-i)*x(n-j)]$ by making sure that no sample is assumed to be zero. This correlation function is defined by:

$$\alpha_{ij} = \frac{1}{N-p} \sum_{n=p}^{N-1} x(n-i)x(n-j) \quad (7)$$

where $x(n)$ is the $n^{th}$ sample of the signal, N is the number of samples used to estimate the correlation coefficients and p is the order of the auto-regressive model. This estimate of the correlation function does not suffer from the problems associated with the biased correlation estimate provided by equation (6).

In the operation of any detector it is generally desirable to detect the presence of a tone and optionally to determine its frequency as fast as possible. Conventionally, a block processing approach has been used in performing the auto-regressive model; i.e., a number N of signal samples are accumulated and then processed. This approach implicitly limits the detection resolution to twice the window size because the first analysis window may not constitute all samples of a sinusoid. Moreover, there is a need for some debouncing to add robustness to the tone recognition. This debouncing operation will increase the time required for the detection, but minimizes the possibility of false detection.

A preferred way to overcome the time resolution limitation of the block processing approach is to perform the computation of the $\alpha_1$ and $\alpha_2$ coefficients at every new incoming sample. This in turn requires new correlation coefficients to be obtained at every sample. If the block processing approach is still retained, this technique has often been termed a "sliding window". Using a sliding window involves executing a large number of computations at every incoming sample. This is undesired. In the preferred embodiment a sliding exponential window is employed instead of a rectangular window in order to minimize the computational requirements. Modeling an exponentially windowed sinusoid will not deliver the same $\alpha_1$ and $\alpha_2$ coefficients for the auto-regressive modeling as would a normal sinusoid, but the effects will be explained in greater detail below.

Applying an exponential window on a signal means multiplying the samples by $\beta^n$, where $\beta$ is a decay factor in the range of 0 to 1. As n grows (toward the most recent sample), the more the corresponding sample is attenuated. In order to minimize computational requirements for the correlation, a recursive computation is desired, i.e., where the correlation coefficients associated with the newest sample are computed from correlation coefficients associated with the previous sample. Therefore, the correlation computation according to the preferred embodiment employs a reverse exponential window where the most recent sample is not attenuated, but the older the sample, the more attenuated it is. This is preferably accomplished by a time-reversing operation. There is an undesired side effect in attempting to time-reverse an exponentially decaying sinusoid: the signal to model then represents an unstable system and, technically speaking, auto-regressive modeling is not valid on unstable signals. Time-reversing is not an issue when using the biased correlation estimate [equation (6)] because the $R_{ij}$ are the same as $R_{i+k,j+k}$ but this is not true for the other form [equation (7)] of the correlation estimate where the $\alpha_{ij}$ are not the same as $\alpha_{i+k,j+k}$. To avoid the undesired side effect of the time reversing, the preferred embodiment considers the incoming samples to be time reversed. In other words, the most recent sample is always tagged with the index 0. When a new sample needs to be analyzed, the previous sample, originally at index 0, is considered being at index 1 and the new sample inherits the index 0. This means that the current sample is considered to be the oldest sample, and the oldest sample is considered to be the current sample for the purpose of stabilizing the time-reversed signal.

To understand how the correlation coefficient estimates $\alpha_{ij}$ can be recursively computed according to the preferred embodiment using a time-reversed exponentially weighted future sliding signal, consider an expansion of the computation for all six $\alpha_{ij}$ $$\left(\text{omitting the scaling factor } \frac{1}{N-p}\right)$$

used in the reduced second-order Yule-Walker set of equations for the original signal spanning the index range of zero to infinity, with zero being the most recent of the time reversed sequence:

$\alpha_{10} = x_1 x_2 + x_2 x_3 + x_3 x_4 +$ $\alpha_{20} = x_0 x_2 + x_1 x_3 + x_2 x_4 +$ $$\alpha_{11}=x_1x_1+x_2x_2+x_3x_3+$$

$$\alpha_{12}=x_1x_0+x_2x_1+x_3x_2+$$

$$\alpha_{21}=x_0x_1+x_1x_2+x_2x_3+$$

$$\alpha_{22}=x_0x_0+x_1x_1+x_2x_2+ \quad (8)$$

With the newest sample being indexed at −1 (index −1 is used here to show the effect of the newest sample) this set of equation becomes:

$$\alpha'_{10}=x_0x_1+x_1x_2+x_2x_3+x_3x_4+$$

$$\alpha'_{20}=x_{-1}x_1+x_0x_2+x_1x_3+x_2x_4+$$

$$\alpha'_{11}=x_0x_0+x_1x_1+x_2x_2+x_3x_3+$$

$$\alpha'_{12}=x_0x_{-1}+x_1x_0+x_2x_1+x_3x_2+$$

$$\alpha'_{21}=x_{-1}x_0+x_0x_1+x_1x_2+x_2x_3+$$

$$\alpha'_{22}=x_{-1}x_{-1}+x_0x_0+x_1x_1+x_2x_2+ \quad (9)$$

It can be noticed that only the first element on the right side of the set of equations (9) contributes to update the value of the new correlation coefficients. Dealing with an exponentially attenuated sliding window, the sample $x_n$ can be re-defined as $\beta^n x_n$ with the new $x_n$ being the un-windowed original signal. The correlation coefficients can then be recursively updated by the following equations, considering $x_0$ to be the most recent sample, $x_1$ the previous sample, and $x_2$ the sample previous to $x_1$:

$$\alpha'_{10}=\beta^3 x_1 x_2 + \beta^2 \alpha_{10}$$

$$\alpha'_{20}=\beta^2 x_0 x_2 + \beta^2 \alpha_{20}$$

$$\alpha'_{11}=\beta^2 x_1 x_1 + \beta^2 \alpha_{11}$$

$$\alpha'_{12}=\beta x_1 x_0 + \beta^2 \alpha_{12}$$

$$\alpha'_{21}=\beta x_0 x_1 + \beta^2 \alpha_{21}$$

$$\alpha'_{22}=x_0 x_0 + \beta^2 \alpha_{22} \quad (10)$$

Thus, to recursively compute the correlation coefficients, a history of only the three most recent samples ($x_0$, $x_1$ and $x_2$) is required as well as the previous values of the correlation coefficients.

As mentioned above, the characteristics of a sinusoidal signal are completely defined from the $a_1$ and $a_2$ auto-regressive coefficients. To understand why, consider an exponentially decaying sine wave defined by:

$$x_n = A\beta^n \sin\left(\phi_0 + \frac{2\pi f_0}{f_s} n\right) \quad (11)$$

where A is the sine wave amplitude, $\beta$ is the decay factor, $\Phi_0$ is the phase at time zero, $f_0$ is the frequency of the sine wave, and $f_s$ is the sampling frequency. This sine wave can be described using the auto-regressive model with:

$$H(z) = \frac{A}{1 - 2\beta\cos\left(\frac{2\pi f_0}{f_s}\right) z^{-1} + \beta^2 z^{-2}} \quad (12)$$

where:

$$a_1 = -2\beta\cos\left(\frac{2\pi f_0}{f_s}\right) \quad \text{and} \quad (13)$$

$$a_2 = \beta^2 \quad (14)$$

and

Knowing the decay factor used for the correlation computation, it is possible to know when the analyzed signal is a pure sinusoidal tone by verifying the computed value of $a_2$, which equals to the square of the decay factor. If the frequency of the tone is desired, the coefficient $a_1$ provides a value representing or indicative of the frequency, and if the exact numerical value of the frequency $f_0$ must be reported it can be derived from:

$$f_0 = \frac{f_s}{2\pi} \cos^{-1}\left(-\frac{a_1}{2\beta}\right) \quad (15)$$

The first two $a_1$ and $a_2$ auto-regressive coefficients are obtained by solving the second-order Yule-Walker set of equations. If it is desired to merely recognize if a signal under analysis is sinusoidal, the value of the $a_2$ coefficient in and of itself indicates the sinusoidal characteristics of a signal. The coefficient $a_2$ is obtained from the correlation coefficients by the following equation:

$$a_2 = \frac{\alpha_{21}\alpha_{10} - \alpha_{11}\alpha_{20}}{\alpha_{11}\alpha_{22} - \alpha_{12}\alpha_{21}}. \quad (16)$$

The coefficient $a_1$, which is indicative of the tone frequency, is obtained from the correlation coefficients and the $a_2$ coefficient as follows:

$$a_1 = -\frac{\alpha_{10} + \alpha_{12} a_2}{\alpha_{11}}. \quad (17A)$$

Alternatively, the following equation may be used in view of equation (14):

$$a_1 = -\frac{\alpha_{10} + \alpha_{12}\beta^2}{\alpha_{11}}. \quad (17B)$$

When updating the correlation coefficients, the preferred embodiment enables some reduction in the computation complexity to be achieved. First, it will be noticed that $\alpha_{12}$ is the same as $\alpha_{21}$ therefore only one update computation is required for these two correlation coefficients. Second, the current value of $\alpha_{11}$ which uses $x_1$ is $\beta^2$ times the previous value of $\alpha_{22}$ which is using $x_0$. In the same line, the current value for $\alpha_{10}$ which uses $x_1$ and $x_2$ is $\beta^2$ times the previous value $\alpha_{12}$ which is using $x_0$ and $x_1$. Accordingly, to minimize the computations, the following set of equations can be performed in this order to recursively obtain the correlation coefficients:

$$\alpha'_{10}=\beta^2 \alpha_{12}$$

$$\alpha'_{11}=\beta^2 \alpha_{22}$$

$$\alpha'_{20}=\beta^2 x_0 x_2 + \beta^2 \alpha_{20}$$

$$\alpha'_{12}=\beta x_0 x_1 + \beta^2 \alpha_{12}$$

$$\alpha'_{22}=x_0 x_0 + \beta^2 \alpha_{22}$$

$$\alpha'_{21}=\alpha'_{12} \quad (18)$$

From the foregoing, it will be noted that it is possible to blindly recognize a pure tone by using the $a_1$ and $a_2$ auto-regressive coefficients of a second order auto-regressive model. However, in order to validate the recognition and arrive at a conclusive detection, preferably some additional decisional criteria are added. This added processing is preferred due to the presence of noise and distortion in the analyzed signal as a result of which the $a_2$ coefficient will not exactly match the value of $\beta^2$ In addition, the value of the coefficient $a_1$ depends only on the decay factor $\beta$ and the frequency of the tone. The analyzed signal is considered to be sinusoidal only when the modeled signal has the correct decay factor. In this case, the coefficient $a_1$ should depend only on the frequency (since the decay factor is known and fixed) but due to the presence of noise or distortion, the real value of $a_1$ will be influenced by the value of $a_2$.

Therefore, to validate the presence of a tone, some degree of debouncing may be required. For instance, the value of the auto-regressive coefficient $a_2$ should preferably be equal or close to $\beta^2$ within an acceptable tolerance $\epsilon$ over a contiguous number of samples before the signal is declared to be sinusoidal in order to take in account noise and distortion. The condition of the $a_2$ coefficient being close to $\beta^2$ can be mathematically expressed as:

$$(\beta^2-\epsilon)<a_2<(\beta^2+\epsilon) \tag{19}$$

and preferably this condition will exist over $N_{on}$ consecutive samples before declaring the presence of a single frequency tone. Alternatively, the value of the coefficient $a_2$ may be within some other predetermined range of $\beta^2$ over $N_{on}$ consecutive samples.

If desired, an optional extra condition to use in the validation is to test for an almost constant value for the coefficient $a_1$, thereby indicating a tone with stable frequency. This condition can be mathematically expressed as:

$$(a_1(i)-\delta)<a_1(n)<(a_1(i)+\delta), \text{ for } n-N_{on}<i<n-1 \tag{20}$$

where $a_1(n)$ is the current $a_1$ coefficient, $a_1(i)$ is one of a number of previously calculated $a_1$ coefficients, and $\delta$ is a tolerance error. In the preferred embodiment, the value of $a_1$ is computed from $a_2$ in accordance with equation (17A) or (17B) and averaged over $N_{on}$ samples in order to report the value of the detected frequency.

Another preferred criteria in validating the presence of a tone is to ensure that the power of the incoming signal is sufficiently high to ensure non-spurious readings. The coefficient $\alpha_{22}$ is readily available from the above correlation coefficients and provides a good approximation of the incoming power if the decay factor a is close enough to unity. This is because under such circumstances $\alpha_{22}$ is proportional to $$\sum \frac{x_n^2}{N},$$

the power of the signal, where N is the number of samples used to perform the power measurement. Alternatively, any other measure of the power of the incoming signal can be used, including a running computation of the foregoing equation. Thus, one way the condition of the existence of sufficient power in the analyzed signal can be mathematically expressed as:

$$\alpha_{22} \geq \text{MinPower}, \tag{21A}$$

and alternatively, $$\sum \frac{x_n^2}{N} \geq \text{MinPower}, \tag{21B}$$

where Minpower is the threshold value.

Conversely, any of the following conditions may be met before declaring the termination of a single frequency tone:
a) not enough power in the analyzed signal, e.g., $\alpha_{22}<\text{MinPower}$;
b) the $a_2$ coefficient is not close to $\beta^2$, i.e., $(\beta^2-\epsilon)>a_2>(\beta^2+\epsilon)$; and optionally,
c) the $a_1$ coefficient is not stable, i.e., there are one or more $a_1(n)$ with $(a_1(i)-\delta)>a_1(n)$ or $a_1(n)>(a_1(i)+\delta)$ within $n-N_{on}<i<n-1$.

The first condition preferably causes the detector 10 to declare the loss of the tone at any sample where the estimate of the analyzed signal power ($\alpha_{22}$) becomes less than the minimum required (Minpower). The second condition should be considered true when the condition is met over a number of $N_{off}$ consecutive samples. By requiring consecutive samples to meet the condition, the detector is made more immune to noise and distortion.

Note that the decay factor $\beta$ preferably lies in the range of $0<\beta<1$. When $\beta$ is a relatively low value, the exponentially decaying sine-wave equivalent of the signal under analysis retains a weak "memory" of prior samples of the signals. Conversely, when $\beta$ is a relatively high value, the exponentially decaying sine-wave equivalent of the signal under analysis retains a strong "memory" of prior samples of the signals. This characteristic can be employed to tune the detector. More specifically, when $\beta$ is a relatively high value, the speed of detection is decreased but the accuracy is increased, and when $\beta$ is a relatively low value the speed of detection is increased but the accuracy is decreased.

Figure 1B:
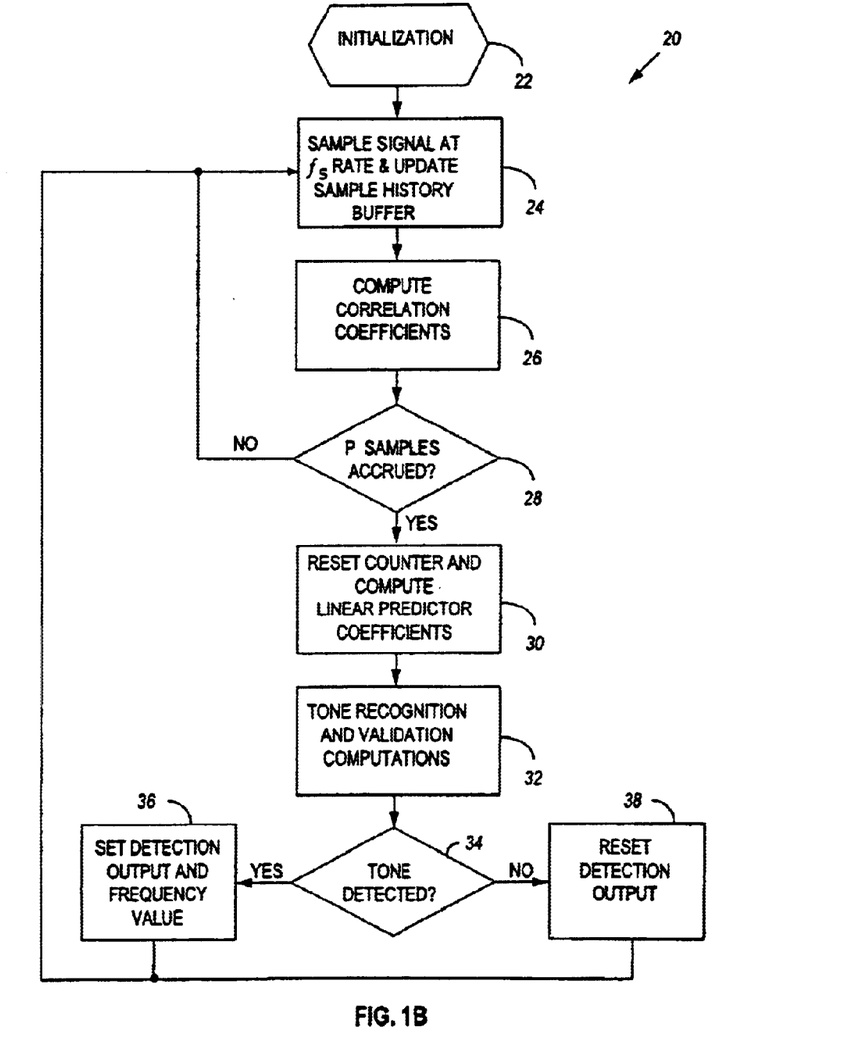
FIG. 1B is a flowchart of a program executed by the tone detector shown in FIG. 1A.

FIG. 1B is a flow chart summarizing the above discussion and demonstrating the program 20 executed on the DSP 12. In a first step 22 all the required variables are initialized. More specifically, the auto-regressive coefficients $a_1$ and $a_2$ are set to zero, the correlation coefficients $\alpha'_{10}, \alpha'_{11}, \alpha'_{20}, \alpha'_{12}, \alpha'_{21}, \alpha'_{22}$ are set to zero, and a three-deep sample history buffer is set to zero.

Step 24 through 38 form part of an endless loop construct. At step 24, the signal 14 is sampled at a rate $f_s$ and the sample history buffer is updated.

At a following step 26, the correlation coefficients $\alpha'_{10}, \alpha'_{11}, \alpha'_{20}, \alpha'_{12}, \alpha'_{21}, \alpha'_{22}$ are computed preferably in accordance with one of the equations sets (10) or (18). Note that the correlation coefficients are updated for each sample of the signal obtained at step 24.

At a following step 28, a counter is tested. The counter determines whether or not P samples have been obtained. If yes, control is passed to the following step 30 for computation of the auto-regressive coefficients and subsequent decision of whether or not a tone has been recognized; otherwise control is passed back to sampling step 24. The value of P may be 1, in which case steps 30 and following are performed for each sample of the signal. Alternatively, these steps may be periodically performed in which case P will be greater than 1. The choice of the value of P will depend on the specific application and the sampling frequency.

At step 30 the counter used in step 28 is reset and the auto-regressive coefficients $a_1$ and $a_2$ are computed in accordance with equations (16) and (17).

At step 32 the tone recognition condition specified in equation (19) is evaluated. Preferably the conditions specified in equations (20) and (21) are also evaluated in order to validate the tone recognition, and the non-fulfilment of any of these conditions may indicate the absence of a tone where presently one had been detected.

At step 34, if the conditions evaluated at step 32 have been fulfilled then control passes to step 36 which sets the detection output signal 16 and optionally the numerical value of the detected frequency as evaluated by equation (15) is provided on frequency output signal 18. Otherwise, control passes to step 38 wherein the detection output signal 16 is reset if previously set or left unchanged.

Figure 2:
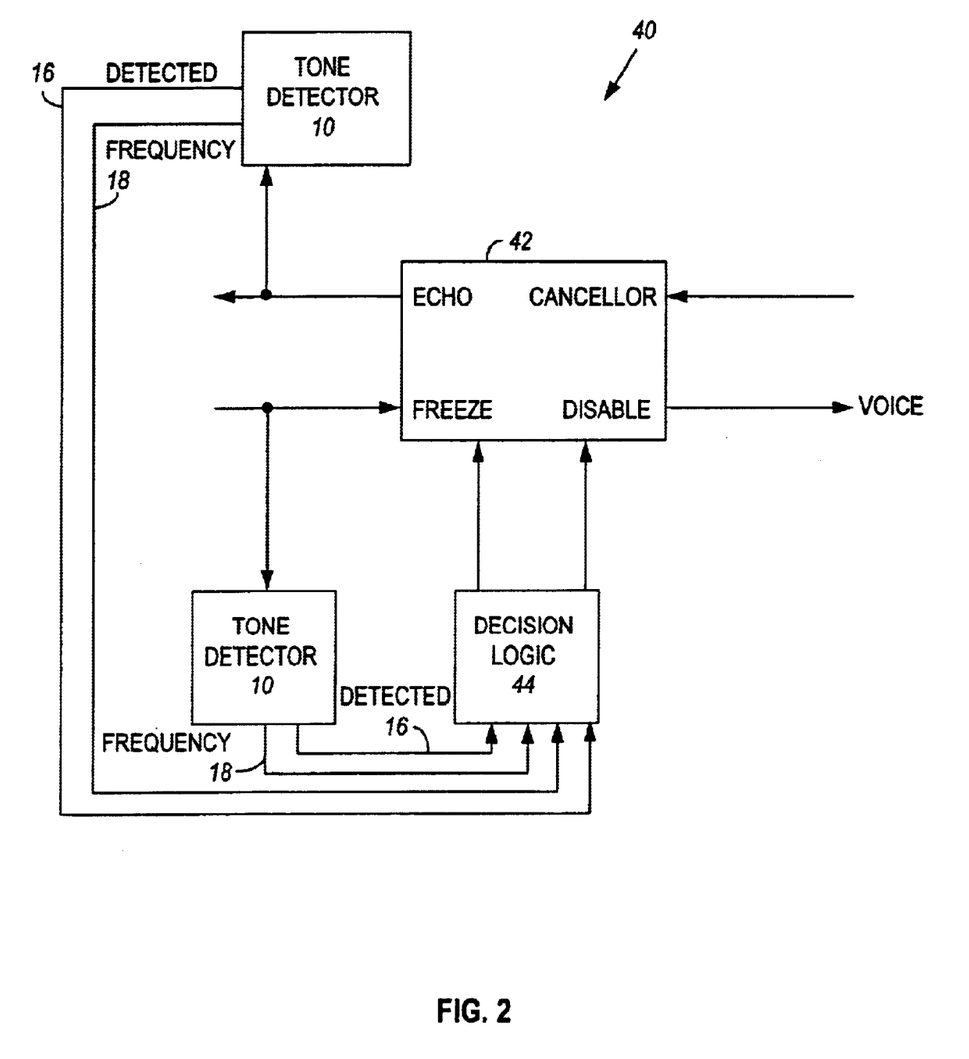
FIG. 2 is a system block diagram showing the tone detector of the preferred embodiment used to control an echo-canceler circuit.

FIG. 2 shows how the tone detectors 10 may be used in an echo-cancellation system 40. Two tone detectors 10 are disposed to intercept bi-directional signals propagated through an adaptive echo-cancellation circuit 42, as shown. The detection and frequency outputs 16 and 18 of the tone detectors are connected to a decision logic circuit 44, which in turn is connected to the echo-cancellation circuit 42 so as to freeze or disable it. The logic circuit 44 is configured to disable the echo-cancellation circuit 42 if any of the tone detectors detect a tone of a specific frequency used to convey signalling information in order to avoid the problem of eliminating the tone as described above. The logic circuit 44 is also configured to freeze, i.e., stop the adaptive behaviour of, the echo-cancellation circuit 42 if both tone detectors detect a tone of the same frequency.

Those skilled in the art will appreciate that numerous modifications and variations may be made to the preferred embodiment without departing from the spirit and scope of the invention.

What is claimed is:

1. A method for recognizing a tone in a signal using at least a second order non-biased auto-regressive model defined by a first auto-regressive coefficient and a second auto-regressive coefficient, said method comprising:

(a) sampling the signal at a constant sampling rate and, for each sample thereof, recursively determining a finite number of current correlation coefficients using an exponentially weighted, future sliding equivalent of the signal, said signal being time reversed such that prior to each determination of the current correlation coefficients as aforesaid, a current received sample and consecutively received previous samples of the signal are time reversed such that the said current received sample is defined as an oldest sample, an oldest of the said consecutively received previous samples is defined as a current sample and, where more than two consecutively received previous samples of the signal are used in the said determination, all said consecutively received previous samples other than the said oldest thereof are also defined to be time reversed as to their received sampling order, and wherein the current correlation coefficients are determined using pre-existing values of correlation coefficients determined in a previous determination, the current sample and at least two consecutively received previous samples of the signal;

(b) periodically determining at least a second auto-regressive coefficient for modelling the signal using the current correlation coefficients; and (c) recognizing the presence of the tone based on the second auto-regressive coefficient.

2. The method according to claim 1, wherein step 1(b) is executed every P samples, P being an integer number of at least one.

3. The method according to claim 2, wherein recognizing the presence of the tone includes confirming that the second auto-regressive coefficient is within a predetermined range of the square of an exponential decay factor used to define the exponentially weighted future sliding equivalent of the signal.

4. The method according to claim 3, wherein the step of recognizing the presence of the tone further includes validating the presence of the tone by determining the power of the signal and confirming that the power exceeds a threshold power.

5. The method according to claim 4, wherein validating the presence of the tone further includes computing the first auto-regressive coefficient and confirming the stability of the first auto-regressive coefficient over a number of iterations.

6. The method according to claim 1, wherein the auto-regressive model for the exponentially weighted fixture sliding equivalent of the signal is defined by a transfer function H(z), wherein:

$$H(z) = \frac{A}{1 - 2\beta\cos\left(\frac{2\pi f_0}{f_s}\right)z^{-1} + \beta^2 z^{-2}}$$

where $f_0$ is the frequency of a detected tone, $f_s$ is the sampling frequency, and $\beta$ is an exponential decay factor.

7. The method according to claim 6 wherein the first and second auto-regressive coefficients, $a_1$ and $a_2$, are defined by:

$$a_1 = -2\beta\cos\left(\frac{2\pi f_0}{f_s}\right) \quad \text{and}$$

$$a_2 = \beta^2.$$

and

8. The method according to claim 7, wherein the current correlation coefficients are $\alpha'_{10}, \alpha'_{11}, \alpha'_{20}, \alpha'_{12}, \alpha'_{21}, \alpha'_{22}$ which are computed according to one of the following first and second sets of equations, the first set being, $$\alpha'_{10} = \beta^3 x_1 x_2 + \beta^2 \alpha_{10}$$

$$\alpha'_{20} = \beta^2 x_0 x_2 + \beta^2 \alpha_{20}$$

$$\alpha'_{11} = \beta^2 x_1 x_1 + \beta^2 \alpha_{11}$$

$$\alpha'_{12} = \beta x_1 x_0 + \beta^2 \alpha_{12}$$

$$\alpha'_{21} = \beta x_0 x_1 + \beta^2 \alpha_{21}$$

$$\alpha'_{22} = x_0 x_0 + \beta^2 \alpha_{22}$$

and the second set being, $$\alpha'_{10} = \beta^2 \alpha_{12}$$

$$\alpha'_{11} = \beta^2 \alpha_{22}$$

$$\alpha'_{20} = \beta^2 x_0 x_2 + \beta^2 \alpha_{20}$$

$$\alpha'_{12} = \beta x_0 x_1 + \beta^2 \alpha_{12}$$

$$\alpha'_{22} = x_0 x_0 + \beta^2 \alpha_{22}$$

$$\alpha'_{21} = \alpha'_{12}$$

wherein:

$x_0$ is the current sample of the signal, $x_1$ is a sample of the signal immediately previous to $x_0$, $x_2$ is a sample of the signal immediately previous to $x_1$, and $\alpha_{10}, \alpha_{11}, \alpha_{20}, \alpha_{12}, \alpha_{21}, \alpha_{22}$ are the pre-existing values of the correlation coefficients.

9. The method according to claim 8, wherein the first and second auto-regressive coefficients $a_1$ and $a_2$ are computed from the current correlation coefficients as follows:

$$a_2 = \frac{\alpha_{21}\alpha_{10} - \alpha_{11}\alpha_{20}}{\alpha_{11}\alpha_{22} - \alpha_{12}\alpha_{21}}, \quad \text{and} \quad a_1 = -\frac{\alpha_{10}\alpha_{12}a_2}{\alpha_{11}}.$$

10. A method for detecting a tone and its frequency in a signal using at least a second order non-biased auto-regressive model defined by a first auto-regressive coefficient and a second auto-regressive coefficient, said method comprising:

(a) sampling the signal at a constant sampling rate and, for each sample thereof, recursively computing a finite number of current correlation coefficients using a an exponentially weighted future sliding equivalent of the signal, said signal being time reversed such that prior to each computation of the current correlation coefficients as aforesaid, a current received sample and consecutively received previous samples of the signal are time reversed such that the said current received sample is defined as an oldest sample, an oldest of said consecutively received previous samples is defined as a current sample and, where more than two consecutively received previous samples of the signals are used in the said computation, all said consecutively received previous samples other than the said oldest thereof are also defined to be reversed as to their received sampling order, and wherein the current correlation coefficients are computed using correlation coefficients computed in a previous iteration, the current sample of the signal and at least two consecutively received previous samples of the signal;

(b) periodically computing at least the first auto-regressive coefficient and the second auto-regressive coefficient for modelling the signal using the current correlation coefficients;

(c) recognizing the presence of the tone based on the second auto-regressive coefficient; and (d) determining the frequency of the tone based on the first auto-regressive coefficient and the sampling frequency.

11. The method according to claim 10, wherein step 10(b) is executed every P samples, P being an integer number of at least one.

12. The method according to claim 11, wherein the step of recognizing the presence of the tone includes confirming that the second auto-regressive coefficient is within a pre-determined range of the square of an exponential decay factor used to define the exponentially weighted future sliding equivalent of the signal.

13. The method according to claim 12, wherein the step of recognizing the presence of the tone further includes validating the presence of the tone by determining the power of the signal and confirming that the power exceeds a threshold power.

14. The method according to claim 13, wherein validating the presence of the tone further includes confirming the stability of the first auto-regressive coefficient over a number of iterations.

15. The method according to claim 10, wherein the auto-regressive model for the exponentially weighted future sliding equivalent of the signal is defined by a transfer function H(z), wherein $$H(z) = \frac{A}{1 - 2\beta\cos\left(\frac{2\pi f_0}{f_s}\right)z^{-1} + \beta^2 z^{-2}}$$

where $f_0$ is the frequency of a detected tone, $f_s$ is the sampling frequency, and $\beta$ is an exponential decay factor.

16. The method according to claim 15, wherein the first and second auto-regressive coefficients, $a_1$ and $a_2$, are defined by:

$$a_1 = -2\beta\cos\left(\frac{2\pi f_0}{f_s}\right) \quad \text{and}$$

$$a_2 = \beta^2.$$

and

17. The method according to claim 16, wherein the current correlation coefficients are $\alpha'_{10}, \alpha'_{11}, \alpha'_{20}, \alpha'_{12}, \alpha'_{21}, \alpha'_{22}$ which are computed according to one of the following first and second sets of equations, the first set being, $\alpha'_{10} = \beta^3 x_1 x_2 + \beta^2 \alpha_{10}$ $\alpha'_{20} = \beta^2 x_0 x_2 + \beta^2 \alpha_{20}$ $\alpha'_{11} = \beta^2 x_1 x_1 + \beta^2 \alpha_{11}$ $\alpha'_{12} = \beta x_1 x_0 + \beta^2 \alpha_{12}$ $\alpha'_{21} = \beta x_0 x_1 + \beta^2 \alpha_{21}$ $\alpha'_{22} = x_0 x_0 + \beta^2 \alpha_{22}$ and the second set being, $\alpha'_{10} = \beta^2 \alpha_{12}$ $\alpha'_{11} = \beta^2 \alpha_{22}$ $\alpha'_{20} = \beta^2 x_0 x_2 + \beta^2 \alpha_{20}$ $\alpha'_{12} = \beta x_0 x_1 + \beta^2 \alpha_{12}$ $\alpha'_{22} = x_0 x_0 + \beta^2 \alpha_{22}$ $\alpha'_{21} = \alpha'_{12}$ wherein:

$x_0$ is the current sample of the signal, $x_1$ is a sample of the signal immediately previous to $x_0$, $x_2$ is a sample of the signal immediately previous to $x_1$, and $\alpha_{10}, \alpha_{11}, \alpha_{20}, \alpha_{12}, \alpha_{21}, \alpha_{22}$ are values of the correlation coefficients computed in a previous iteration.

18. The method according to claim 17, wherein the first and second auto-regressive coefficients $a_1$ and $a_2$ are computed from the current correlation coefficients as follows:

$$a_2 = \frac{\alpha_{21}\alpha_{10} - \alpha_{11}\alpha_{20}}{\alpha_{11}\alpha_{22} - \alpha_{12}\alpha_{21}}, \quad \text{and} \quad a_1 = -\frac{\alpha_{10}\alpha_{12}a_2}{\alpha_{11}}.$$

* * * * *